(12) United States Patent
Grinsted (10) Patent No.: US 6,837,653 B1
(45) Date of Patent: Jan. 4, 2005

(54) PLOUGHS

(75) Inventor: Timothy William Grinsted, Stocksfield (GB)

(73) Assignee: The Engineering Business Ltd., Northumberland (GB)

( * ) Notice: Subject to any disclaimer, the term of this patent is extended or adjusted under 35 U.S.C. 154(b) by 0 days.

(21) Appl. No.: 10/089,006

(22) PCT Filed: Sep. 21, 2000

(86) PCT No.: PCT/GB00/03615

§ 371 (c)(1),
(2), (4) Date: May 22, 2002

(87) PCT Pub. No.: WO01/21900

PCT Pub. Date: Mar. 29, 2001

(30) Foreign Application Priority Data

Sep. 21, 1999 (GB) .............................................. 9922247

(51) Int. Cl.[7] .............................. F16L 1/024; E02F 5/02
(52) U.S. Cl. ...................... 405/161; 405/159; 405/164; 405/169; 37/367; 172/684.5; 172/741
(58) Field of Search ................................ 405/159, 160, 405/161, 164–169, 180, 181; 37/366, 367, 370, 313; 172/184.5, 677, 699, 741, 744, 734

(56) References Cited

U.S. PATENT DOCUMENTS

| 4,106,335 | A | * | 8/1978 | Shatto | 73/862.042 |
|---|---|---|---|---|---|
| 4,329,793 | A | * | 5/1982 | Reece | 37/367 |
| 4,585,372 | A | | 4/1986 | Grinsted et al. | |
| 4,714,378 | A | * | 12/1987 | Lincoln | 405/163 |
| 4,759,138 | A | | 7/1988 | Grinsted | |
| 4,802,793 | A | | 2/1989 | Grinsted et al. | |
| 6,050,009 | A | * | 4/2000 | Adamson et al. | 37/367 |
| 6,061,932 | A | * | 5/2000 | Rowley | 37/309 |
| 6,435,772 | B1 | * | 8/2002 | Reece | 405/164 |

FOREIGN PATENT DOCUMENTS

| DE | 32 45 625 A1 | 9/1983 | |
|---|---|---|---|
| EP | 0010915 A1 | 5/1980 | |
| EP | 0 452 021 A1 | 10/1991 | |
| FR | 1107641 | 1/1956 | |
| GB | 2285821 A | 7/1995 | |
| JP | 58020840 | * 2/1983 | 405/164 |

* cited by examiner

Primary Examiner—Jong-Suk (James) Lee
(74) Attorney, Agent, or Firm—Edwin D. Schindler (57) ABSTRACT

A marine plough includes twin, complementary steering mechanisms, one or more soil-engaging fins, which are able to be steered, and a tow rope attachment mechanism that enables adjustment of the position of the tow rope retention point relative to the plough. This alters the position at which the line of a tow rope crosses the longitudinal axis of the plough, so that the plough can operate at offset tow positions. The tow rope attachment mechanism includes a bridle having two bridle limbs terminating at respective bridle limb retention points. The adjustment of the position of the tow rope retention point relative to the plough is done by moving the bridle rope retention points or adjusting the relative length of the bridle limbs. The bridle limb retention points can be moved, using cylinders, from towing positions to lifting positions at which the tow bridle can be used to lift plough in a substantially level attitude. The soil-engaging fins are carried by supporting skids, in turn carried by a steering member able to be pivoted relative to the plough about a substantially vertical axis. Ploughing depth can be adjusted by altering the vertical distance between the skids and the steering member.

18 Claims, 12 Drawing Sheets

PLOUGHS

This application is a national stage of PCT/GB00/03615 filed Sep. 21, 2000 which claims priority from United Kingdom Application No. 9922247.3 filed Sep. 21, 1999.

BACKGROUND TO THE INVENTION

This invention relates to ploughs, particularly those for burial of cables and pipelines in the bed of the sea or other water. Ploughs are well-known for use in protecting cable and pipelines underwater. The cables or pipelines are buried to protect them from damage by, for example, fishing equipment or anchors. Typically these ploughs are towed via a towrope by a vessel on the surface of the water, but may be towed by an underwater tractor. Such ploughs are fitted with a soil-engaging share that is shaped to dig into the seabed under the action of the towing force and produce a trench into which the cable or pipe is placed. The ploughs usually lay the cable or pipeline in the trench. The invention applies to all types of plough.

Hitherto, such ploughs have often been fitted with a steering system that operates by exerting transverse forces on the tow wire and thus generating couples on the plough that alter the direction of travel of the plough. Some of these ploughs are fitted with a bridle and crank mechanism to minimise the forces required to steer the plough. Such ploughs are described in patent EP 0185422. In some applications this mechanism can be lifted into an upright position to move the two wire attachment points to a position above the plough so that the same wire can lift the plough in a level attitude.

This method of steering a plough has the disadvantage that the direction of travel of the plough is affected by changes in the tow rope direction together with any side forces, for example from side slopes that the plough may be traversing. The plough or a part of it is effectively dragged sideways across the seabed.

Ploughs that steer by means of steerable fins attached to skids that support the front of the plough are also known. Such a plough is shown in EP 0010915. This design overcomes the disadvantage of the first design in that the plough can be steered relative to the seabed without being dragged across the seabed. The mechanism works in the same way as the steering in a car. To minimise the steering forces required from the steerable fins on the skids, the tow rope is connected near to the back of the plough, or to a towing mechanism with a single tow point slidably mounted on a curved arm extending lateraly from the main plough beam, to give the effect of towing from near the back—see EP 0010915.

This method of steering has the disadvantage that without such a force minimisation towing mechanism the steering angles relative to the tow rope are limited. Also the force minimisation towing mechanism described would be difficult to adapt for larger angles of steering because of the requirement for a mechanism of greater size.

A further feature of these ploughs is the need for the towing mechanism to pass over the top of the plough and therefore also, where applicable, the cable or pipeline passage through the plough. This prevents or limits one's ability to mount other equipment, particularly if the tow points must be transferred to a lifting position.

SUMMARY OF THE INVENTION

According to a first aspect of the present invention, there is provided a plough comprising a plough share, one or more steerable soil-engaging fins and a tow rope attachment mechanism having a tow rope retention point, the tow rope attachment mechanism being adapted to enable adjustment of the position of the tow rope retention point relative to the plough, thereby altering the position at which the line of a tow rope retained by the toe rope retention point crosses the longitudinal axis of the plough, so that the plough can operate at a range of offset tow positions. The tow rope attachment mechanism may comprise releasable mechanical locking means for preventing the said adjustment from taking place.

Preferably, the tow rope attachment mechanism comprises a bridle having two bridle limbs terminating at one end at the tow rope retention point and at the other at respective bridle limb retention points. The tow rope attachment mechanism may be adapted to enable the said adjustment of the position of the tow rope retention point relative to the plough by movement of the bridle rope retention points. For example, the tow rope attachment mechanism may include a pair of arms, each pivotable relative to the plough about a substantially vertical axis at its inboard end and providing a respective bridle rope attachment point at its outboard end. The pivotable arms may extend substantially laterally with respect to the plough or substantially longitudinally with respect to the plough.

Preferably, the tow rope attachment mechanism is adapted to enable movement of the bridle limb retention points relative to the plough from respective towing positions to respective lifting positions at which the bridle can be used to lift the plough in a substantially level attitude.

As an alternative to the above, the tow rope attachment mechanism may be adapted to enable the said adjustment of the position of the tow rope retention point relative to the plough by adjustment of the relative length of the bridle limbs. For example, the bridle limb retention points may comprise guides through which the bridle limbs pass and the plough may further comprise a pair of movable bridle limb attachment points to which the bridle limbs are attached. According to a second aspect of the present invention, there is provided a plough comprising a plough share and a tow rope attachment mechanism having a pair of bridle limb retention points, the tow rope attachment mechanism being adapted to enable adjustment of the relative length of a pair of bridle limbs retained by the bridle limb retention points, thereby altering the position at which the line of a tow rope connected to the bridle limbs crosses the longitudinal axis of the plough, so that the plough can operate at a range of offset tow positions, in which the bridle limb retention points comprise guides through which the bridle limbs pass, and further comprising a pair of movable bridle limb attachment points to which the bridle limbs are attached.

Preferably, the steerable soil-engaging fins are carried by one or more supporting skids. The supporting skids are themselves preferably carried by a steering member pivotable relative to the plough about a substantially vertical axis. Means may be provided for adjusting ploughing depth by altering the vertical distance between the skids and the steering member.

Where there are two or more skids, the vertical distance between one such skid and the steering member may be alterable independently of the vertical distance between another such skid and the steering member.

A third aspect of the present invention provides a plough comprising a plough share and a tow rope attachment mechanism having a pair of bridle limb attachment points, the tow rope attachment mechanism being adapted to enable movement of the bridle limb attachment points relative to the plough, thereby altering the position at which the line of a tow rope connected to the bridle limbs crosses the longitudinal axis of the plough, so that the plough can operate at a range of offset tow positions, and further comprising a mechanical linkage between the bridle limb attachment points such that movement of one bridle limb attachment point in one sense is accompanied by movement of the other in the other sense.

A fourth and related aspect of the invention provides a plough comprising a plough share and a tow rope attachment mechanism having a pair of bridle limbs, the tow rope attachment mechanism being adapted to enable adjustment of the relative length of the bridle limbs, thereby altering the position at which the line of a tow rope connected to the bridle limbs crosses the longitudinal axis of the plough, so that the plough can operate at a range of offset tow positions, and further comprising a mechanical linkage between the bridle limbs such that lengthening of one bridle limb is accompanied by shortening of the other.

BRIEF DESCRIPTION OF THE DRAWINGS

The present invention will now be described by way of example with reference to the accompanying drawings, in which.

DETAILED DESCRIPTION

Referring to the FIGS. 1 to 5, a seabed cable plough is made up of an elongate chassis 1, a share 3 at the rear of plough 10, and support skids (2 and 4) two each at the front and rear respectively. The front skids 2 support the plough on the seabed 6 and are adjustable by hydraulic rams 42 in FIGS. 3 and 5) to set the trenching depth of the plough. The share 3 penetrates the seabed as the plough is towed by a ship (not shown) via a towrope 5. Cable 7 to be buried enters the front of the plough at bellmouth 12 and exits underground at the back of the plough 8. Rear spaced skids 4 support the back of the plough when operating in very soft seabed soils. The plough may be fitted with a control and monitoring system and a hydraulic power pack, typically located on top of the plough at 45, allowing the operators on the ship to operate it effectively by controlling the position of the hydraulic rams. Alternative adjustment mechanisms to rams can be used although rams are particularly suitable when the plough is used in the submarine environment.

Figure 1:
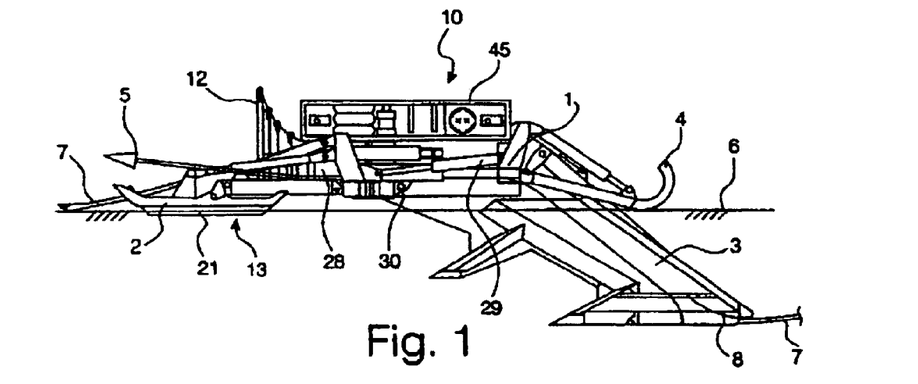
FIG. 1 shows in elevation a typical plough in operating position; in the seabed.
Figure 2:
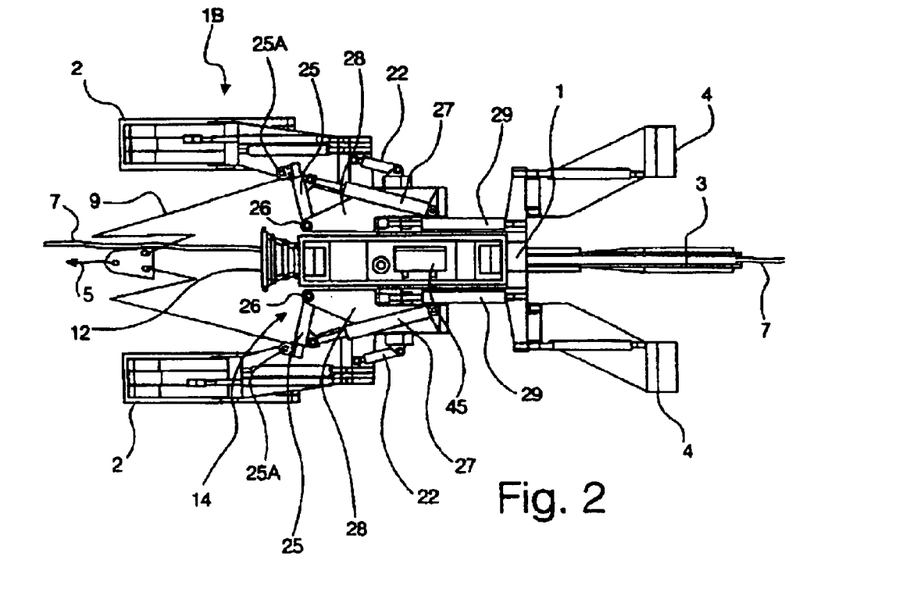
FIG. 2 shows a plan view of the plough of FIG. 1.

Assemblies 28 at each side of the chassis 1 are rotatable by hydraulic rams 29 about a horizontal axis at pivot 30 and support tow adjustment mechanism 14 comprising, in this embodiment, hydraulic rams 27 sidewardly, extending pivotable arms 25 to which tow bridle 9 is attached. In one aspect the invention uses these two mechanisms 13, 14 to control its orientation and/or motion on the seabed. The first 13 incorporates front skids 2, which are fitted with soil penetrating fins 21, either the skids and/or the fins being rotatable with respect to the plough body. Steering mechanism 13 in FIGS. 1 and 2 is formed by hydraulic rams 22 and skids 2 which can steer the plough even when the plough is in an offset position. The second 14 incorporates an adjustable bridle mechanism or an adjustable towing mechanism for connecting to a bridle which in turn connects to a tow member such as a tow wire. The adjustable mechanism can be arranged in one embodiment to generate a steering couple on the plough with respect to the tow wire. In another embodiment, the adjustable mechanism is arranged to reduce steering moments imposed on the plough from the tow cable, for example, to allow offset towing. The two adjusting arrangements 13 and 14 in combination can reduce the effect changes in the tow wire direction have on the plough whilst at the same time allowing ploughing, and indeed steering while ploughing, at larger offset angles.

Figure 3:
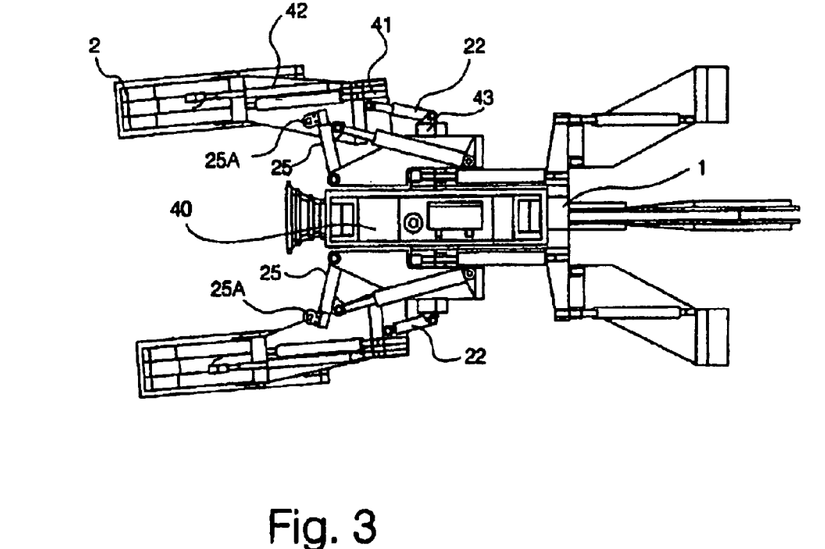
FIG. 3 shows a plan view of the plough of FIGS. 1 and 2 with the skids angled to steer the plough to the left.
Figure 6:
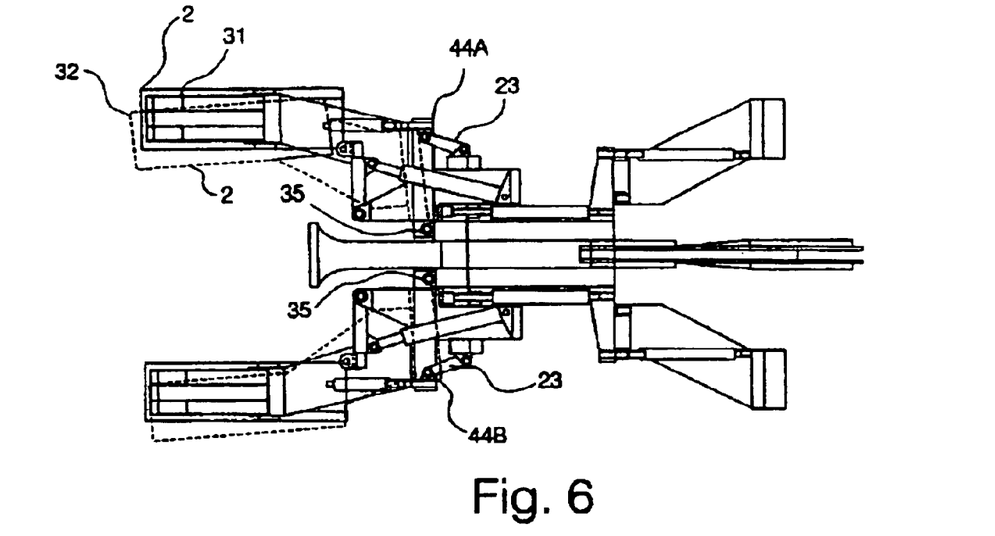
FIGS. 6 and 7 show plan views of ploughs fitted with alternative methods of steering the skids.
Figure 7:
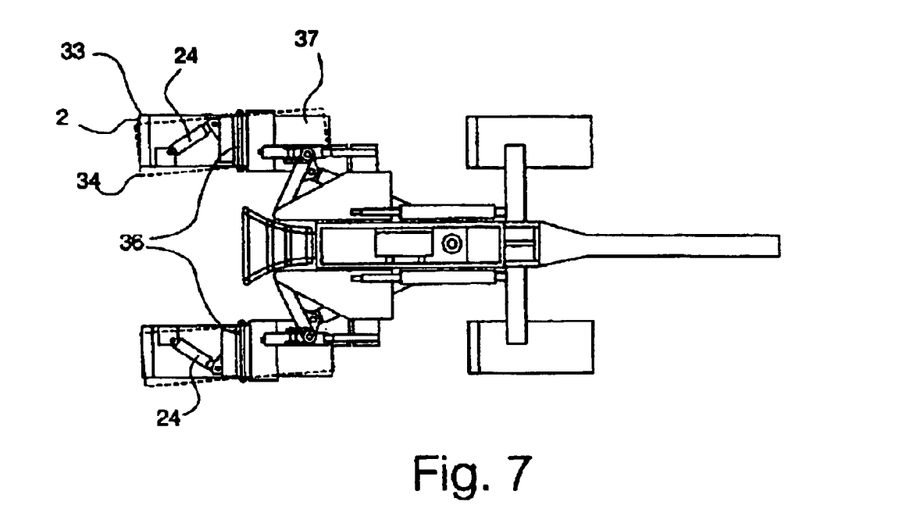

Spaced skids 2 each carry a ground engaging fin 21 which generate side forces to steer the plough when these are at an angle with respect to the chassis 1 as shown in FIGS. 3, 6 and 7. More than one fin may be provided on each skid. Typically the fins extend the length of the skids. The skids are rotated with respect to the chassis by the action of hydraulic cylinders 22 in FIG. 3, 23 in FIG. 6 and 24 in FIG. 7. The fins may be rotatable with respect to the chassis 1 as well or instead of the skids.

Figure 5:
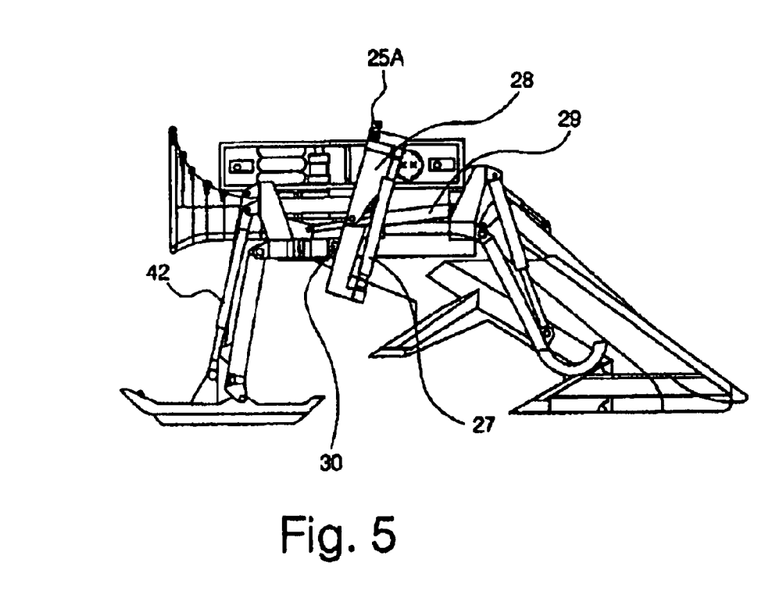
FIG. 5 shows an elevation of the plough of FIGS. 1 and 2 with the tow rope in lifting position.

FIGS. 3, 6 and 7 show alternative ways of adjusting the angle of the skids to steer the plough. In FIG. 3, the two skids 2 with the depth adjusting linkage 42 are mounted on transverse mounting beam 41 which is itself pivotally mounted on chassis 1 at pivot 40. The adjusting linkage 42 controls the height of the plough with respect to the skids as shown in FIG. 5. The skids are rotated in a substantially horizontal plane with respect to the plough by the action of rams 22 extending between pivoting mounting beam 41 and a second mounting beam fixed to chassis 1. Cylinders 22 angle the beam 41 and hence the skids.

In FIG. 6 the beam 41 in FIG. 3 is split to form two mounting beams 44A, 44B pivotally mounted to the plough at 35. Cylinders 23 rotate each beam independently to steer the plough about pivots 35. Two positions of skids 2 are shown at 31 and 32.

In FIG. 7 the hydraulic rams or cylinders 24 rotate only the skids 2 relative to a skid mount 37 from a position 33 to a position 34 around a pivot in the region of 36. These pivots may be in the form of slots, sliders or other means of achieving rotation. Rotation of fins relative to the skids is also possible although this is less preferable because of the exposure to damage of such a mechanism as well as the adverse forces on the fins from the ground.

Figure 4:
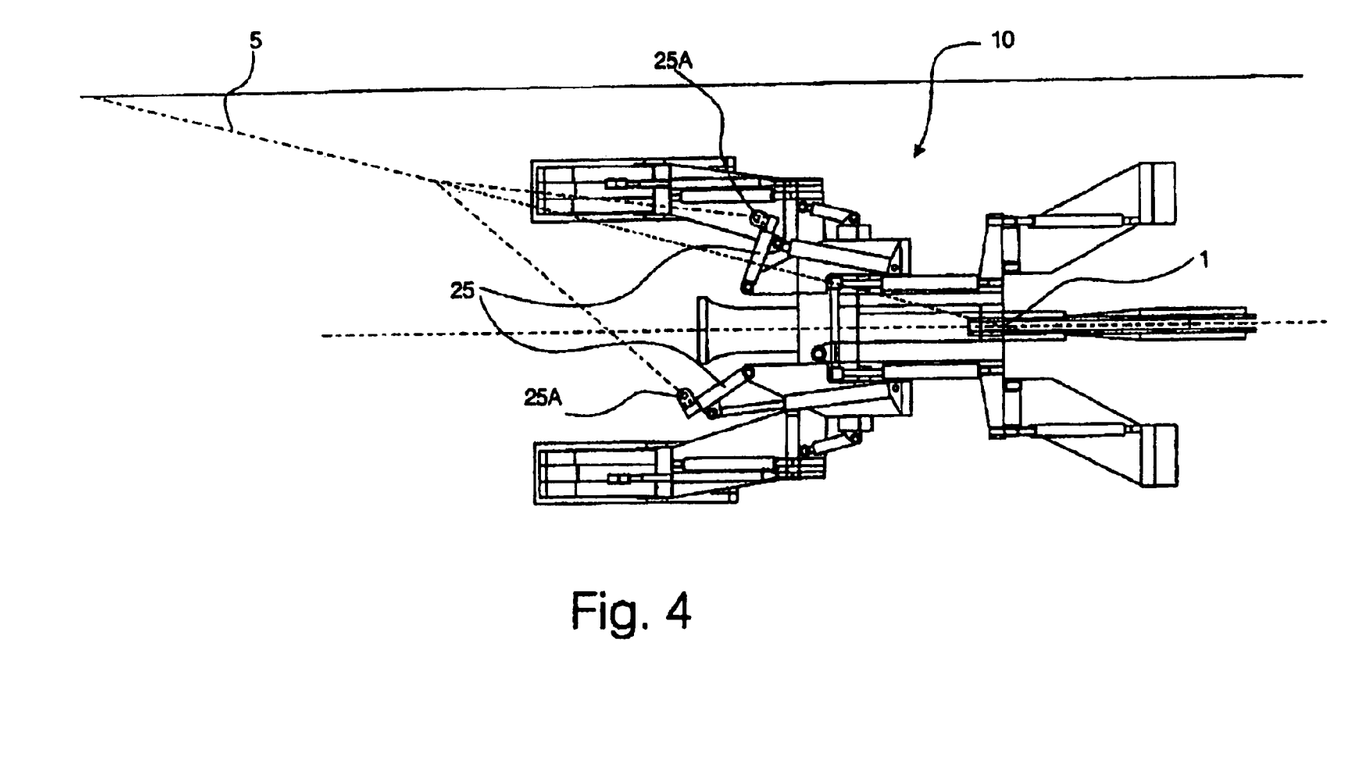
FIG. 4 shows a plan view of the plough of FIGS. 1 and 2 with the towing mechanism moved to accommodate an offset tow position.

In FIGS. 1 to 4 the tow rope 5 is connected to tow bridle 9 and this is connected to arms 25 at attachment points. 25A. These arms 25 can rotate about pivots 26 about a generally vertical axis with respect to the plough under the action of hydraulic rams or cylinders 27. In FIG. 4 the arms 25 have been moved to accommodate the offset tow position of towrope 5. If the arms are not moved the bridle 9 would generate a steering moment on the plough because of the extra tension in one side of the bridle. The hydraulic rams move the attachment points 25A so that the centre of rotation of the bridle lies more or less above the centre of resistance of the plough ie above the landsides of the plough share 3. In this way steering moments generated by the bridle are reduced. Steering can then take place by angling the skids 2 with fins 21 to allow the plough to follow the desired course on the seabed, or to allow for other side forces, for example from crossing a side slope. The arms can be moved to other positions to suit other offset tow positions on either side of the plough centreline. Of course the rams 27 can be used to generate a steering moment on the plough if required, for example when crossing a side slope, particularly when offset ploughing across a side slope.

As can be seen from FIGS. 1, 2 and 5 the towrope adjusting mechanism 14 formed by arms 25 and cylinder 27 is mounted on assemblies 28 that are mounted pivotally on plough chassis 1. Assembly 28 can be rotated under the control of hydraulic cylinders 29. For normal operation the assembly 28 is positioned as shown in FIGS. 1 and 2, and the plough is pulled along by the towrope 5. For lifting and lowering the plough to and from the seabed the hydraulic cylinders 29 can be operated to rotate assembly 28 about pivot 30 to the position shown in FIG. 5, so that the tow wire can be used to lift the plough in an approximately horizontal position A benefit of having two pivoted structures 28 for lifting the towrope is that the hydraulic and instrumentation package 45 can be located above the central cable route, thus lifting it higher on the machine. This helps to keep the framework and its contents out of the soil in very soft seabed conditions.

Figure 8:
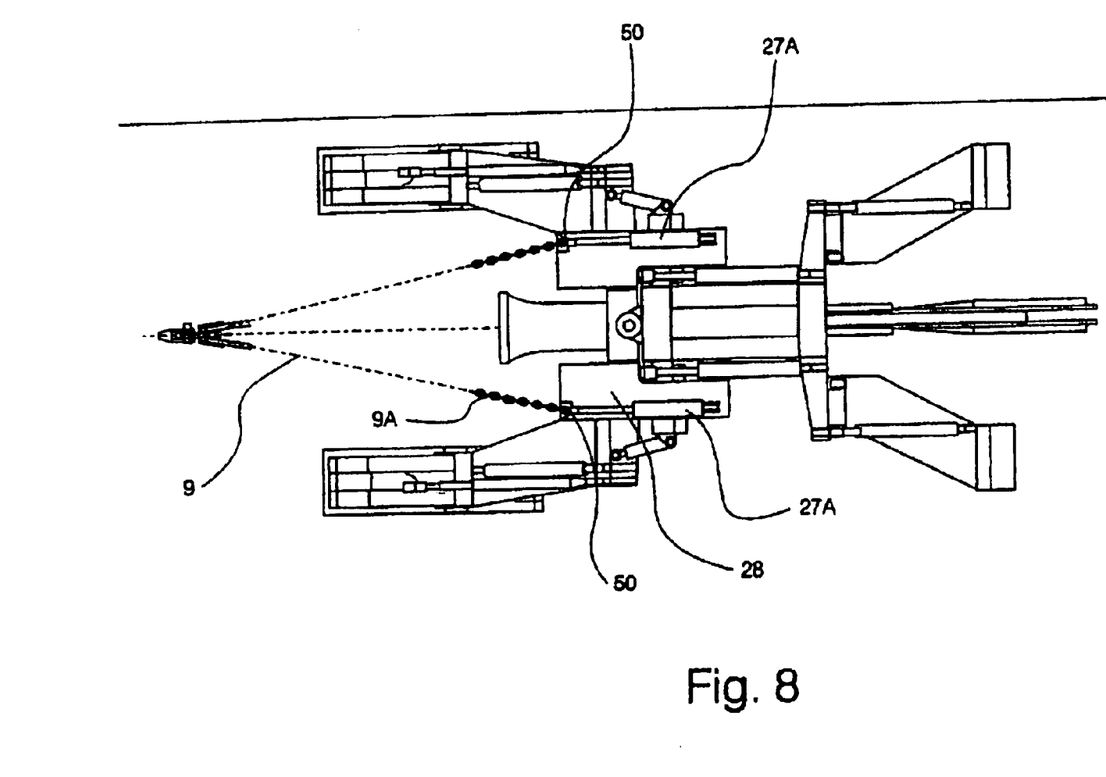
FIGS. 8 and 9 show plan views of a plough fitted with an alternative method of adjusting the towing bridle in, respectively, an extended tow position and on offset tow position.
Figure 9:
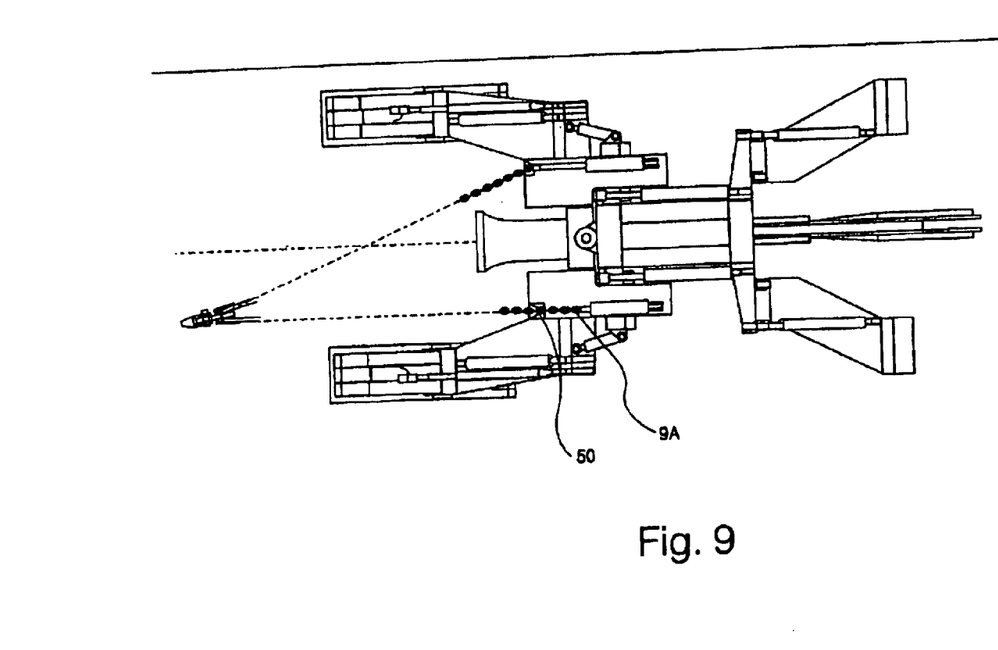

FIGS. 8 and 9 show bridle 9 connected via terminating chains 50 to hydraulic rams 27A. In this case rams 27A are substantially parallel to the longitudinal axis of the plough and these act to lengthen or shorten the arms of the bridle. The chains pass through guides 50, which are optionally fixed to assembly 28. When guides 50 are fixed the effective attachment points of the bridle to the plough are located at guides 50 and do not change in position. In FIG. 9, chain 9A has been pulled through guide 50 to shorten the left hand bridle arm, thus allowing for offset towing to the right.

Figure 10:
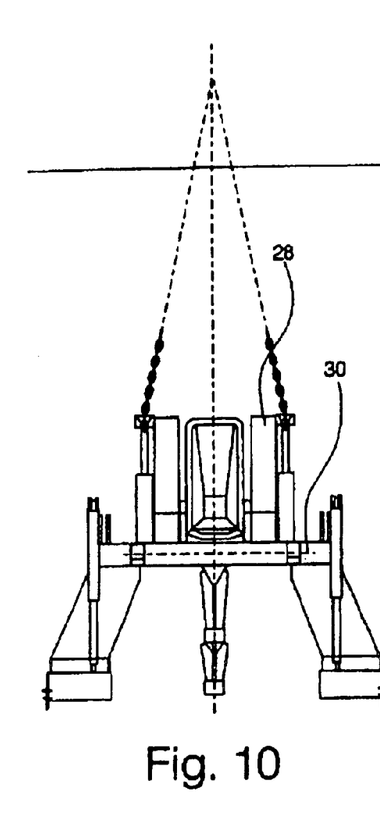
FIGS. 10 and 11 show elevations of the plough of FIGS. 8 and 9 from the front of the plough with the towing bridle in an upright position.
Figure 11:
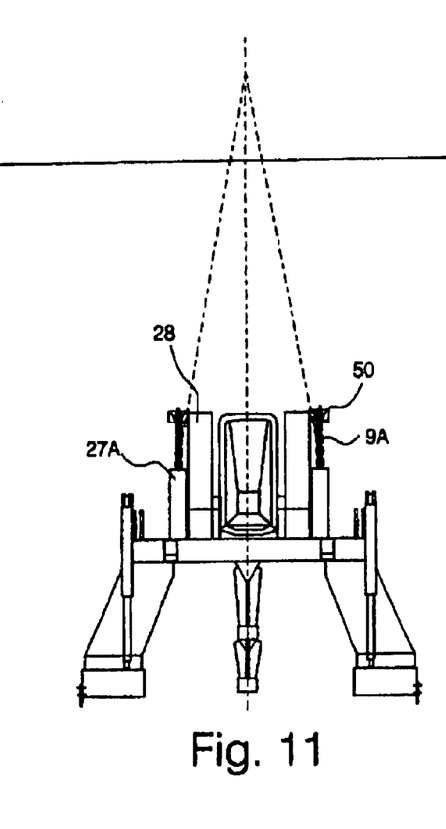

FIGS. 10 and 11 show front views of the plough in FIGS. 8 and 9 in which assembly 28 has been rotated through pivot 30 to allow the plough to be raised or lowered or manoeuvred on the seafloor, over obstacles for example. In FIG. 11 both arms of the bridle have been shortened since chains 9A have been retracted through, in this case, fixed guides 50.

Figure 12:
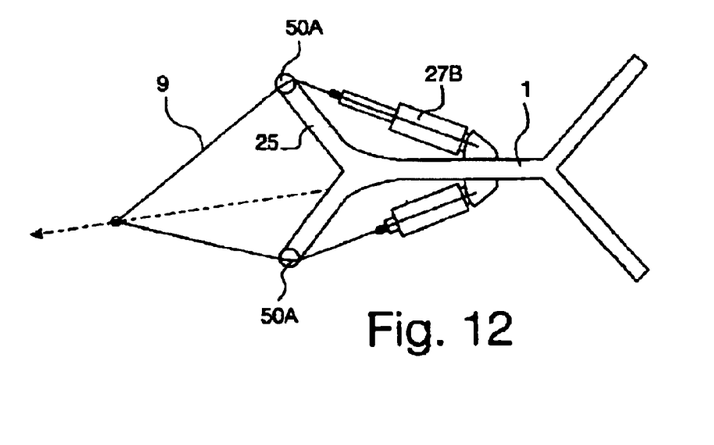
FIGS. 12–15 show plan views of alternative chassis and bridle arrangements (steerable skids and other details omitted for clarity in the case of FIGS. 12 and 13).
Figure 13:
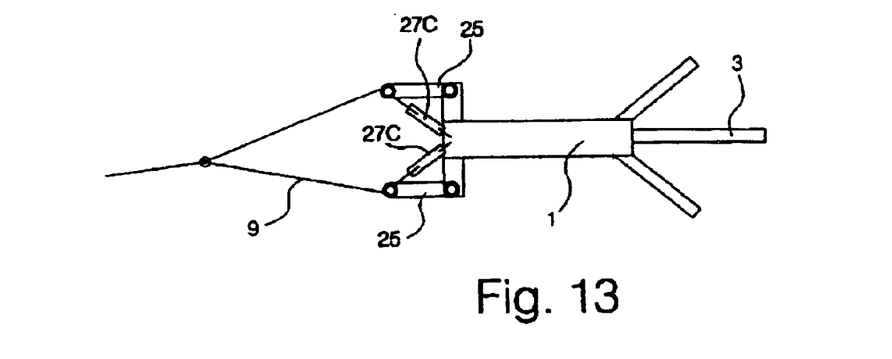

FIG. 12 shows in plan view a Y shaped plough beam with forwardly fixed arms 25 to which guides 50 are mounted. Bridle arms 9 pass through guides 50 and are lengthened or shortened under control of hydraulic rams 27B. FIG. 13 shows in plan view forwardly extending pivoting arms mounted to chassis 1 and rotated under control of hydraulic rams 27C. This arrangement is less efficient in lengthening and shortening the bridle arms.

Figure 14:
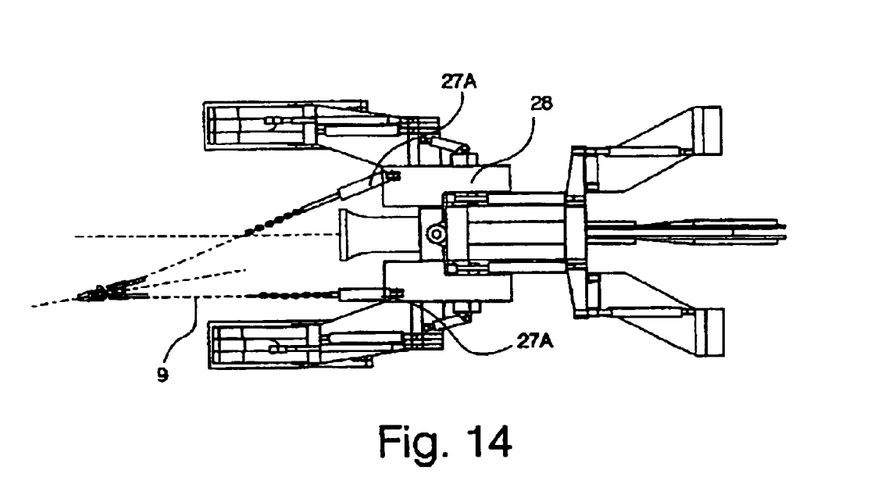
Figure 15:
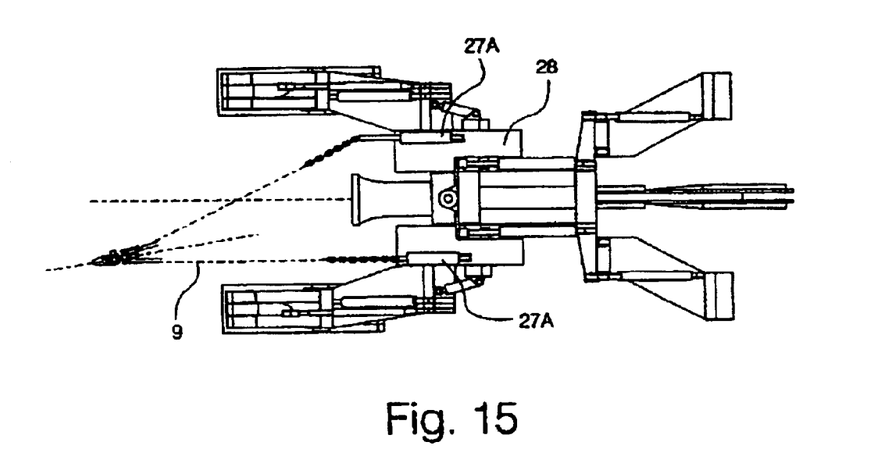

FIGS. 14 and 15 show bridle 9 connected via terminating chains 50 to hydraulic rams 27A. In the case of FIG. 14, rams 27A are free to pivot relative to the: plough and so effectively form part of the bridle arms; in FIG. 15, reams 27A are substantially parallel to the longitudinal axis of the plough. In these cases, the chains do not pass through guides and in the case of FIG. 15, this can lead to substantial and undesirable bending moments on the hydraulic rams. These arrangements are considered to be less favourable than the arrangements shown in FIGS. 8 and 9.

Figure 16:
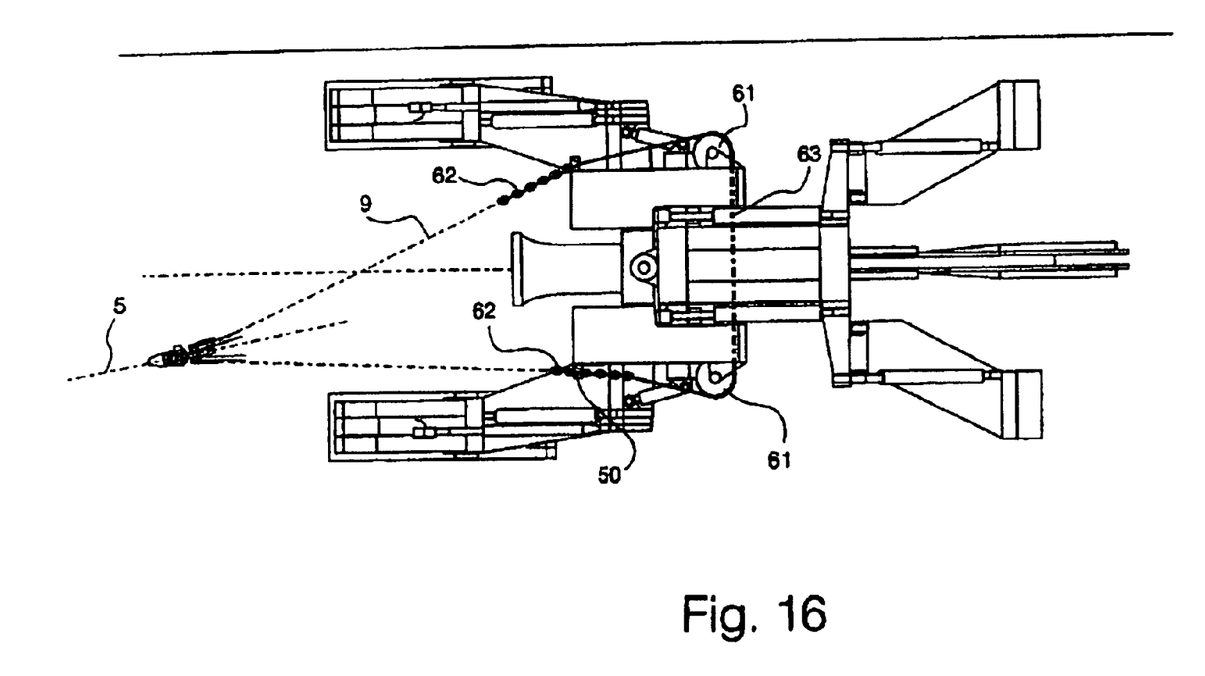
FIGS. 16 and 17 show two passive bridle adjustment mechanisms.
Figure 17:
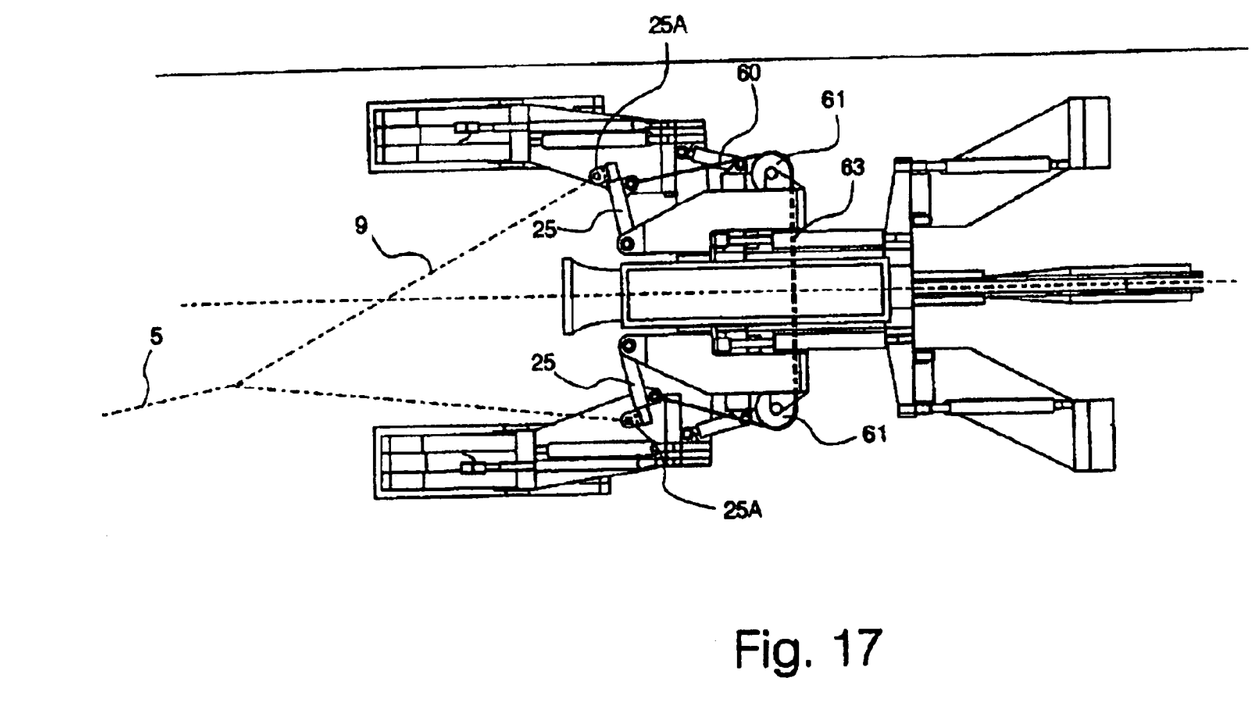

FIGS. 16 and 17 show two passive bridle adjustment mechanisms, i.e. mechanisms in which the adjustment of the geometry of the bridle is caused by changes in the direction of tow, but is not (or need not be) caused or assisted by active or powered mechanisms on the plough. In FIG. 16, the bridle limbs, or extensions of then in the form of chain 62 and cable or rope 63, pass through guides 50 and around secondary guides or pulleys 61 and are connected together to form a closed loop. In FIG. 17, the bridle limbs 9 terminate on pivoting arms 25 that are restrained and coupled together by a rope, cable, chain or similar 60 that passes around guides or pulleys 61. The FIG. 17 arrangement has the advantage over the FIG. 16 arrangement that friction at the guides 50 is avoided. If a mechanism that is not entirely passive is desired, the pulleys 61 could for example be powered.

Preferably, the inter-linking rope, cable or chain etc. 63 passes along the pivot axis of for the lifting drawbars. This could be achieved by using tubular pivot pins.

What is claimed is:

1. A plough, comprising:
    a plough body;
    a tow rope;
    a tow rope attachment mechanism having a tow rope retention point for said tow rope, said tow rope attachment mechanism including means for adjusting a position of said tow rope retention point relative to said plough body for altering the position at which a line of said tow rope retained by said tow rope retention point crosses a longitudinal axis of said plough body for allowing said plough to operate at a range of offset tow positions;
    a plough share for penetrating a seabed as said plough share is pulled by said tow rope;
    a steerable soil-engaging fin; and,
    means for controlling said steerable soil-engaging fin independently of said means for adjusting a position of said tow rope retention point relative to said plough body.

2. The plough according to claim 1, wherein said tow rope attachment mechanism comprises a bridle having two bridle limbs terminating at one end at said tow rope retention point and at the other ends at respective bridle limb retention points.

3. The plough according to claim 2, wherein said tow rope attachment mechanism includes means for adjusting the position of said tow rope retention point relative to said plough body via movement of said respective bridle limb retention points.

4. The plough according to claim 3, wherein said tow rope attachment mechanism includes a pair of arms, each arm of said pair or arms being pivotable relative to said plough body about a substantially vertical, axis at its inboard end and providing a respective bridle rope attachment point at its outboard end.

5. The plough according to claim 4, wherein said pair of arms extend substantially laterally relative to said plough body.

6. The plough according to claim 4, wherein said pair of arms extend substantially longitudinally relative to said plough body.

7. The plough according to claim 2, wherein said tow rope attachment mechanism includes means for moving said bridle limb retention points relative to said plough body from respective towing positions to respective lifting positions, so that said bridle is capable of lifting said plough body in a substantially level attitude.

8. The plough according to claim 2, wherein said tow rope attachment mechanism includes means for adjusting the position of said tow rope retention point relative to said plough body via adjustment of a relative length of said bridle limbs.

9. The plough according to claim 8, wherein said bridle limb retention points comprise guides through which said bridle limbs pass and further comprising a pair of movable bridle limb attachment points to which said bridle limbs are attached.

10. The plough according to claim 1, wherein said soil-engaging fin is one fin of a plurality of soil-engaging fins.

11. The plough according to, claim 1, wherein said soil-engaging fin is carried by at least one supporting skid.

12. The plough according to claim 11, wherein said at least one supporting skid is carried by a steering member pivotable relative to said plough body about a substantially vertical axis.

13. The plough according to claim 12, further comprising means for adjusting ploughing depth by altering vertical distance between said supporting skids and said steering member.

14. The plough according to claim 13, wherein said at least one supporting skid is a plurality or supporting skids and the vertical distance between one skid of said plurality of supporting skids and said steering member is able to be altered independently of the vertical distance between another supporting skid of said plurality of supporting skids and said steering member.

15. A plough, comprising:
    a plough body;
    a tow rope;
    a tow rope attachment mechanism for said tow rope, said tow rope attachment mechanism having a pair of bridle limb retention points and including means for adjusting relative lengths of a pair of bridle limbs retained by said bridle limb retention points for altering a position at which a line of said tow rope connected to said pair of bridle limbs crosses a longitudinal axis of said plough body, so that said plough is operable at a range of offset tow positions, wherein in said bridle limb retention points comprise guides through which said pair or bridle limbs pass, and further comprising a pair of movable bridle limb attachment points to which said bridle limbs are attached; and,
    a plough share for penetrating a seabed as said plough share is pulled by said tow rope.

16. The plough according to claim 15, further comprising at least one steerable soil engaging fin controllable via said tow rope attachment mechanism.

17. A plough, comprising:
    a plough body;
    a tow rope;
    a tow rope attachment mechanism for said tow rope, said tow rope attachment mechanism having a pair of bridle limbs and means for adjusting relative lengths of said pair of bridle limbs for altering a position at which a line of said tow rope connected to said pair of bridle limbs crosses a longitudinal axis of said plough body, so that said plough is operable at a range of offset tow positions, and further comprising a mechanical linkage between said pair of bridle limbs for lengthening a first bridle limb of said pair of bridle limbs, while shortening a second bridle limb of said pair of bridle limbs; and,
    a plough share for penetrating a seabed as said plough share is pulled by said tow rope.

18. The plough according to claim 17, further comprising at least one steerable soil engaging fin controllable via said tow rope attachment mechanism.

* * * * *